US011779037B2

(12) United States Patent
Raybern

(10) Patent No.: US 11,779,037 B2
(45) Date of Patent: Oct. 10, 2023

(54) ADAPTIVE FOOD PREPARATION AUTOMATION AND CONTROL

(71) Applicant: DISH Network L.L.C., Englewood, CO (US)

(72) Inventor: Brandon Raybern, Englewood, CO (US)

(73) Assignee: DISH Network L.L.C., Englewood, CO (US)

(*) Notice: Subject to any disclaimer, the term of this patent is extended or adjusted under 35 U.S.C. 154(b) by 237 days.

(21) Appl. No.: 16/921,616

(22) Filed: Jul. 6, 2020

(65) Prior Publication Data

US 2022/0000152 A1     Jan. 6, 2022

(51) Int. Cl.
*A23L 5/10*        (2016.01)
*G16Y 40/35*     (2020.01)
*H04L 67/12*     (2022.01)
*G16Y 40/10*     (2020.01)
*G16Y 20/10*     (2020.01)

(52) U.S. Cl.
CPC .............. *A23L 5/10* (2016.08); *G16Y 20/10* (2020.01); *G16Y 40/10* (2020.01); *G16Y 40/35* (2020.01); *H04L 67/12* (2013.01)

(58) Field of Classification Search
CPC .......... A23L 5/10; G16Y 20/10; G16Y 40/10; G16Y 40/35
See application file for complete search history.

(56) References Cited

U.S. PATENT DOCUMENTS

| 10,595,660 | B2 * | 3/2020 | Patadia .................... A47J 27/04 |
| 2013/0092148 | A1 * | 4/2013 | Parvin ................. F24C 15/2057 126/299 D |
| 2018/0213970 | A1 * | 8/2018 | Colston .................. A23B 4/052 |
| 2018/0345485 | A1 * | 12/2018 | Sinnet ....................... A23L 5/10 |
| 2018/0352612 | A1 * | 12/2018 | Hofleitner ................ H05B 6/10 |

* cited by examiner

*Primary Examiner* — Jason D Recek
(74) *Attorney, Agent, or Firm* — KILPATRICK TOWNSEND & STOCKTON LLP

(57) ABSTRACT

Methods, systems, and machine-readable media are provided to facilitate adaptive control for food preparation. First input may be received from a first set of sensors, consequent to detecting a presence of a load on a portion of a heating device. A location of the load with respect to the heating device may be determined. Second input may be received from a second set of sensors, consequent to detecting temperature corresponding to the load. Third input received from a set of devices may be processed, and an adjustment may be determined based on the temperature and the third input. The heating device and/or devices proximate to the heating device may be caused to activate, deactivate, and/or change a setting in accordance with the adjustment.

20 Claims, 6 Drawing Sheets

ADAPTIVE FOOD PREPARATION AUTOMATION AND CONTROL

BACKGROUND

This disclosure generally relates to Internet of Things (IoT), and more particularly to facilitating adaptive food preparation automation and control.

The development of IoT devices and associated applications and services may be a complex proposition. Fully realizing the potential for IoT devices in various applications may present a number of challenges and problems involving field devices, edge devices, network operations/management software, security, device management, and more. There is a need for systems, devices, and methods that address the challenges and problems encumbering development and deployment of IoT devices and that provide for more particularized and useful features. This and other needs are addressed by the present disclosure.

BRIEF SUMMARY

Certain embodiments of the present disclosure relate generally to IoT, and more particularly to facilitating adaptive food preparation automation and control.

In one aspect, a method for adaptive control for food preparation is disclosed. The method may include one or a combination of the following. First input may be received by a control device from a first set of one or more sensors communicatively coupled to the control device, consequent to the first set of one or more sensors detecting indicia of a presence of a load on a portion of a heating device. The first input may correspond to the detected indicia of the presence of the load. The first input from the first set of one or more sensors may be processed by the control device to determine a location of the load with respect to the heating device. Second input may be received by the control device from a second set of one or more sensors communicatively coupled to the control device, consequent to the second set of one or more sensors detecting indicia of temperature corresponding to the load. The second input from the second set of one or more sensors may be processed by the control device to determine a temperature corresponding to the load based at least in part on the second input. Third input received from a set of one or more devices may be processed by the control device, and an adjustment may be determined based at least in part on the temperature and the third input, the adjustment corresponding to activating, deactivating, and/or changing a setting of the heating device and/or one or more devices coupled with the heating device to cause a change corresponding to the load. The heating device and/or one or more devices proximate to the heating device may be caused, by the control device, to activate, deactivate, and/or change the setting in accordance with the adjustment.

In another aspect, a system to facilitate adaptive control for food preparation is disclosed. The system may include one or more processing devices and memory communicatively coupled with and readable by the one or more processing devices and having stored therein machine-readable instructions which, when executed by the one or more processing devices, cause the one or more processing devices to perform operations including one or a combination of the following. First input may be received from a first set of one or more sensors communicatively coupled to the control device, consequent to the first set of one or more sensors detecting indicia of a presence of a load on a portion of a heating device, the first input corresponding to the detected indicia of the presence of the load. The first input from the first set of one or more sensors may be processed to determine a location of the load with respect to the heating device. Second input may be received from a second set of one or more sensors communicatively coupled to the control device, consequent to the second set of one or more sensors detecting indicia of temperature corresponding to the load. The second input from the second set of one or more sensors may be processed to determine a temperature corresponding to the load based at least in part on the second input. Third input received from a set of one or more devices may be processed, and an adjustment may be determined based at least in part on the temperature and the third input, the adjustment corresponding to activating, deactivating, and/or changing a setting of the heating device and/or one or more devices coupled with the heating device to cause a change corresponding to the load. The heating device and/or one or more devices proximate to the heating device may be caused to activate, deactivate, and/or change the setting in accordance with the adjustment.

In yet another aspect, one or more non-transitory, machine-readable media having machine-readable instructions thereon which, when executed by one or more processing devices, cause the one or more processing devices to perform one or a combination of the following. First input may be received from a first set of one or more sensors communicatively coupled to the control device, consequent to the first set of one or more sensors detecting indicia of a presence of a load on a portion of a heating device, the first input corresponding to the detected indicia of the presence of the load. The first input from the first set of one or more sensors may be processed to determine a location of the load with respect to the heating device. Second input may be received from a second set of one or more sensors communicatively coupled to the control device, consequent to the second set of one or more sensors detecting indicia of temperature corresponding to the load. The second input from the second set of one or more sensors may be processed to determine a temperature corresponding to the load based at least in part on the second input. Third input received from a set of one or more devices may be processed, and an adjustment may be determined based at least in part on the temperature and the third input, the adjustment corresponding to activating, deactivating, and/or changing a setting of the heating device and/or one or more devices coupled with the heating device to cause a change corresponding to the load. The heating device and/or one or more devices proximate to the heating device may be caused to activate, deactivate, and/or change the setting in accordance with the adjustment.

In various embodiments, the temperature may correspond to a temperature of an external portion of the load. In various embodiments, the temperature may correspond to a temperature of an internal portion of the load. In various embodiments, the set of one or more devices may include the first set of one or more sensors or a third set of one or more sensors. The third input from the first set of one or more sensors or from the third set of one or more sensors may be analyzed to determine a state of the load in the location based at least in part on the third input. The determining the adjustment may be based at least in part on the state of the load. In various embodiments, the state of the load may correspond to an activity or inactivity with respect to the load in the location with respect to at least a threshold period of time.

In various embodiments, set of one or more devices may include a mobile device. The third input from the mobile device may be processed, and the determining the adjustment may be based at least in part on the third input. In various embodiments, the causing may include causing cause a change in one or both of position and temperature corresponding to the load.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment (s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Figure 1:
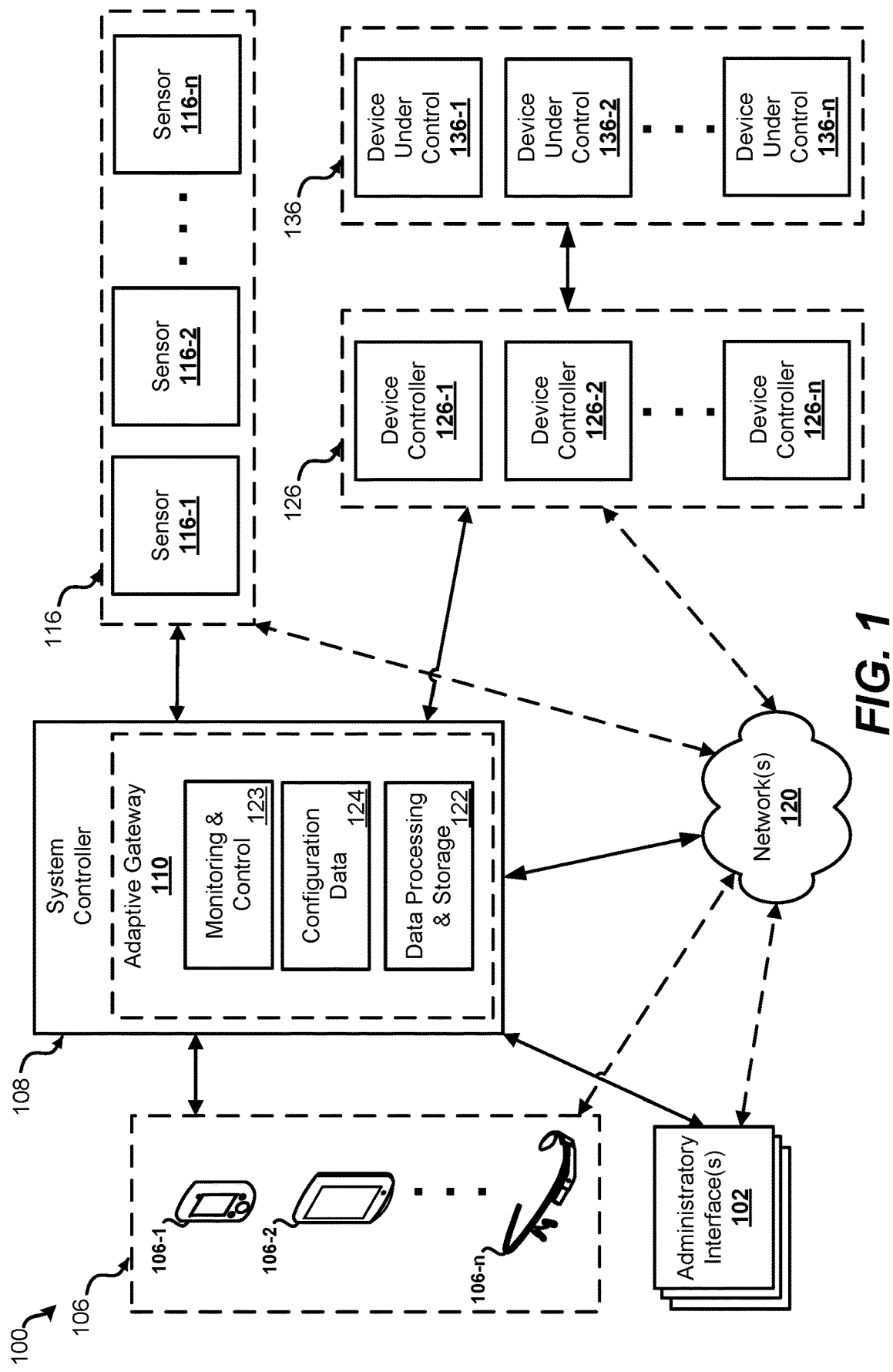
FIG. 1 illustrates an overview of a system to facilitate adaptive food preparation automation and control, in accordance with disclosed embodiments of the present disclosure.

Various embodiments will now be discussed in detail with reference to the accompanying figures, beginning with FIG. 1. FIG. 1 illustrates a diagram of an overview of an embodiment of a system 100 to facilitate adaptive food preparation automation and control, in accordance with embodiments of present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific.

The system 100 may correspond to certain embodiments for food preparation monitoring and control. The system 100 may include a system controller 108. The system controller 108 may be configured to manage one or more other components of the system that communicatively coupled to the system controller 108 via any suitable means, including wired and/or wireless connections. The system controller 108 may be communicatively coupled to one or more control and/or notification interfaces 106. In some embodiments, one or more interfaces 106 may be capable of user notification, showing the status, configuration data, and/or the like. The system controller 108 may provide a user interface (e.g., via an interface 106) to allow for output of information to a user and for input from user with one or more user-selectable interface elements. In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like. The one or more interfaces 106 may be devices that are directly or indirectly connected to the system controller 108 and may receive information, such as notifications, from the system controller 108.

A control interface 106 may include a computing device configured with a control application. In some embodiments, control may be allowed from multiple devices around a premises interfacing to the system controller 108. With some embodiments, the system 100 may also allow control from outside of the premises by way of a control interface 106, in which case control is likely to be routed by way of the one or more networks 120 and servers in the cloud. In various embodiments, the interfaces 106 may include one or more endpoint devices 106 such as various computerized devices 106 that may be associated with a user in the system 100 and that may be configured to facilitate various surfacing of content features, providing user-selectable interface elements, and allowing of user input features as disclosed in various embodiments herein. As indicated, the computing devices 106 may include a laptop computer, a cellular phone and/or smartphone, a tablet computer, smart glasses, a smart watch, or another similar form of wearable computing device or another similar form of mobile device. In some embodiments, the computing devices 106 may include a desktop computer, a kiosk, a television receiver directly or indirectly coupled to one or more display devices, such as a television or a monitor, a set-top box (which may include a television receiver, in some embodiments), a television (which may include a television receiver, in some embodiments), another household device, and/or the like. The computing devices 106 may provide access credentials to the system controller 108 in order for the system controller 108 allow authenticated access to content and features accessible through the system controller 108. It should be understood that the computing devices 106 are exemplary in nature. Access may be provided through a fewer or greater number of computerized devices 106 communicatively couplable with the system controller 108.

The system controller 108 may provide one or more administratory interfaces 102. An administratory interface 102 may include one or a combination of the features of the other interfaces 106, such as one or more icons, widgets, buttons, checkboxes, text, text boxes, text fields, tables, lists, and/or the like interface elements. Additionally, the administratory interface 102 may be further configured to provide administratory access to the system controller 108, the sensors 116, controllers 126, and/or the devices 136. In various embodiments, administratory interfaces 102 may be accessed via a computing device of one or more of the types disclosed herein. In various embodiments, the administratory interfaces 102 may correspond to one or more server systems, computer systems, databases, websites, portals, any repositories of data in any suitable form, and/or the like that facilitate the administratory access over the components of the system 100, allowing administratory access all or portions of the components specifications, configurations, settings, thresholds, diagnostics, operations, corresponding content fetaures disclosed herein, and/or the like. For example, administratorty access may allow setting and/or override of ajdustment features disclosed herein, adding and removing sensors 116, generating one or more operational interrupts to interrupt operations of the sensors 116, controllers 126, and/or the devices 136, cause one or more notifications to devices 106, controllers 126, and/or the devices 136, adjust one or more thresholds for adjustments 382, and/or the like. As another example, the system controller 108 may be configured to provide rolling windows of sensor-captured phenomena to be exposed via an administratory device 102 for a period of time before a triggering event and after the triggering event.

The system controller 108 may be configured to communicate with multiple sensors 116. For example, the system controller 108 may be configured to receive sensor data from one or more sensors and/or sensor systems 116. Such communication may use different communication standards or protocols. The system controller 108 may be configured to provide signals for controlling one or more device controllers 126, which may be control units and/or systems. The device controllers 126 may be integrated with, or otherwise communicatively coupled to, one or more corresponding devices under control 136. The system controller 108 may provide a link when necessary between the communication protocol used by the device controllers 126 and the communication protocol used by an interface 116. In some embodiments, this may be a bridge between Zigbee and Wi-Fi, for example. In certain embodiments, the system controller 108 may include a monitoring and control module 123. In some embodiments, the system controller 108 may be directly connected or coupled to one or more control units 126 and/or sensors 116. Sensors and control units may be wired or wirelessly coupled to the system controller 108. Sensors and control units may be coupled and connected in a serial, parallel, star, hierarchical, and/or the like topologies and may communicate to the television receiver via one or more serial, bus, or wireless protocols and technologies which may include, for example, Wi-Fi, CAN bus, Bluetooth, I2C bus, ZigBee, Z-Wave and/or the like.

In some embodiments, the system 100 may include one or more monitoring/control modules 123 which could be external to the system controller 108. In some embodiments, the system controller 108 may interface to one or more sensors and control units via one or more monitoring/control modules 123. The external monitoring/control modules 123 may be wired or wirelessly coupled to the system controller 108. In some embodiments, the monitoring/control module 123 may connect to the system controller 108 via a communication port such as a USB port, serial port, and/or the like. In some embodiments, the monitoring/control module 123 may connect to the system controller 108 via a wireless communication protocol such as Wi-Fi, Bluetooth, Z-Wave, ZigBee, and/or the like. The external monitoring/control module may include a separate device that may be positioned near the system controller 108 or may be in a different location, remote from the system controller 108. In various embodiments, one or more system controllers 108 may be disposed on the same premises as all or a subset of the one or more sensors 116, one or more device controllers 126, and/or devices 136, and/or may be located remotely off the premises. In some embodiments, one or more system controllers 108 may be communicatively coupled to all or a subset of the one or more sensors 116, one or more device controllers 126, and/or devices 136 via the one or more networks 120 and a server system in the cloud.

Monitoring and control module(s) 123 may be communicatively coupled to components such as sensors 116. Sensors 116 may include any one or combination of temperature sensors, humidity sensors, sound sensors/microphones, proximity sensors, cameras, infrared detectors, motion sensors, weight sensors, and/or the like. In some embodiments, one or more sensors 116 may include one or more cameras configured to have a field of view that may detect one or more loads (e.g., food items) in proximity to the one or more sensors 116. In some embodiments, the one or more sensors 116 may be configured to capture images and/or other indicia of load states, such as any one or combination of: ambient temperature proximate to the load (e.g., within 1 to 5 inches or more from the load); surface temperature of the load; surface temperature of a surface underneath the load and/or proximate to the load (e.g., within 1 to 5 inches or more from the load); movement of the load; non-movement of the load as a function of time (e.g., how long the load has remained stationary since a last detected movement, such as being flipped); position of the load; colors and color changes of the load as a function of time; and/or the like. As disclosed herein, the system controller 108 may process and analyze such sensor data to determine any one or combination of such load states as a function of time and develop particularized load profiles that chronicle the load states of the particular loads.

In some embodiments, monitoring and control module(s) 123 may be communicatively coupled to components such as device controller 126. Device controllers 126 may include any number of switches, solenoids, solid state devices and/or the like configured for controlling (e.g., communicating with, adjusting setting of, activating, deactivating, initiating processes, and/or the like) sensors 116, devices under control 136, turning on/off and otherwise adjusting settings of electronics, and/or the like. One or more of the device controllers 126 may be configured to be able to send control commands to devices under control 136. In various embodiments, a device under control 136 and/or a device controller 126 may correspond to a cooking device, a heating device, a heating element, an appliance, and/or the like. In some embodiments, additionally or alternatively, a device under control 136 and/or a device controller 126 may correspond to a computing device, such as a laptop computer, a cellular phone and/or smartphone, a tablet computer, smart glasses, a smart watch, integrated audio/video systems, touchscreen displays, and/or one of the other computing devices disclosed herein. In some embodiments, a device controller 126 may be a device that plugs in to an electrical outlet of a premises, and other devices, such as an appliance, may be plugged into the device. In various embodiments, one or more of the device controllers 126 may be part of other devices and/or systems 136 or may be communicatively coupled with other devices and/or systems 136 but physically separate therefrom. By way of example, a device controller 126 may be part of or otherwise correspond to a cooking device, a heating device, a heating element, an appliance, computing device, and/or another electric or electronic device. In some embodiments, the device controllers 126 of a system may be controlled via a communication or control interface of the system. For example, the cooking device settings may be configurable and/or controlled via a communication interface of the cooking device 136. device controller 126 may be individually and uniquely identifiable. One or more of the sensors 116 and/or device controllers 126 may be combined into assemblies or units with multiple sensing capabilities and/or control capabilities. A single module may include, for example, a temperature sensor and a motion sensor, another module may include an image sensor and a control unit, etc.

Various embodiments of the system 100 may include multiple sets of one or more sensors 116, e.g., two, three, four, ten, or many more sets of one or more sensors. In some embodiments, one or more sensors 116 may be part of a device under control 136 (e.g., a cooking device, heating device, appliance, and/or the like) of a premises and/or a device controller 126 corresponding to the device under control 136. Several sets of one or more sensors 116 may be configured to capture phenomena at one or more heating devices (e.g., cooking devices) which may or may not be devices under control 136 in various embodiments. Additionally or alternatively, several sets of one or more sensors may be configured to capture phenomena at a single heating device and at different locations at, on, and/or proximate to the heating device. In various embodiments, one or more sets of one or more sensors 116 may be integral or otherwise communicatively coupled to a heating device (which may or may not be a device under control 136 in various embodiments), to a device controller 126, and/or the system controller 108. Additionally or alternatively, in various embodiments, one or more sets of one or more sensors 116 may be integrated with or external to a heating device (which may or may not be a device under control 136 in various embodiments), to a device controller 126, and/or the system controller 108.

A plurality of sensors 116 may include different types of sensors 116, each different type of sensor 116 configured to detect a different type of phenomena and/or generate a different type of data based on the detected phenomena. Thus, a multiplicity of integrated and/or non-integrated sensors may be configured to capture phenomena at a single heating device in order to identify aspects of the device, devices states, one or more loads at the device, load states, and/or the environment proximate to the device and/or one or more loads, e.g., to facilitate any one or combination of image recognition, location detection, temperature sensing, infrared impressions, heat impressions, gestures, movement recognition, and/or the like. In various embodiments disclosed herein, features are disclosed with respect to capturing, analyzing, transmitting, and causing presentation of images with respect to a load. Such image features are to be understood as involving, utilizing, and providing singular images and/or a plurality of images such as video in various embodiments, even though video may not be explicitly discussed in reference to specifics of such image features. Data captured from such sensors 116 may be used in identification and adaptive control processes disclosed herein.

During operation of the system 100, readings from the sensors may be collected, processed, stored, analyzed, modified, and augmented in the system controller 108. In certain embodiments, analysis of the sensors and control of the control units may be determined with configuration data 124 stored in the system controller 108. The configuration data 124 may define how the sensor data is collected, how often, what periods of time, what accuracy is required, what resolution is required, and other characteristics. The configuration data 124 may specify specific sensor and/or control unit settings for a monitoring and/or control application. The configuration data 124 may define how the sensor readings are processed, analyzed, and/or utilized. For example, for some applications, sensor analysis may include collecting sensor readings and performing time-based analysis to determine trends. For other applications, sensor analysis may include monitoring sensor readings to determine if a threshold value of one or more sensor readings has been reached. The function of the system 100 may be determined by loading and/or identifying configuration data 124 for an application. In some embodiments, the system 100 may be configured for more than one monitoring or control operation by selecting or loading the appropriate configuration data 124. Configuration data 124 may define monitoring operations, reactive measures, activation constraints for components of the system, and/or the like.

Readings processed by the monitoring and control modules 123 may be logged and analyzed by the data processing and storage module 122. The data processing and storage 122 module may analyze the received data and generate control signals, schedules, and/or sequences for controlling components. The data processing and storage module 122 may, for example, receive sensor data from temperature sensors 116, images sensors 116, motion sensors 116, location sensors 116, and/or the like.

Figure 2:
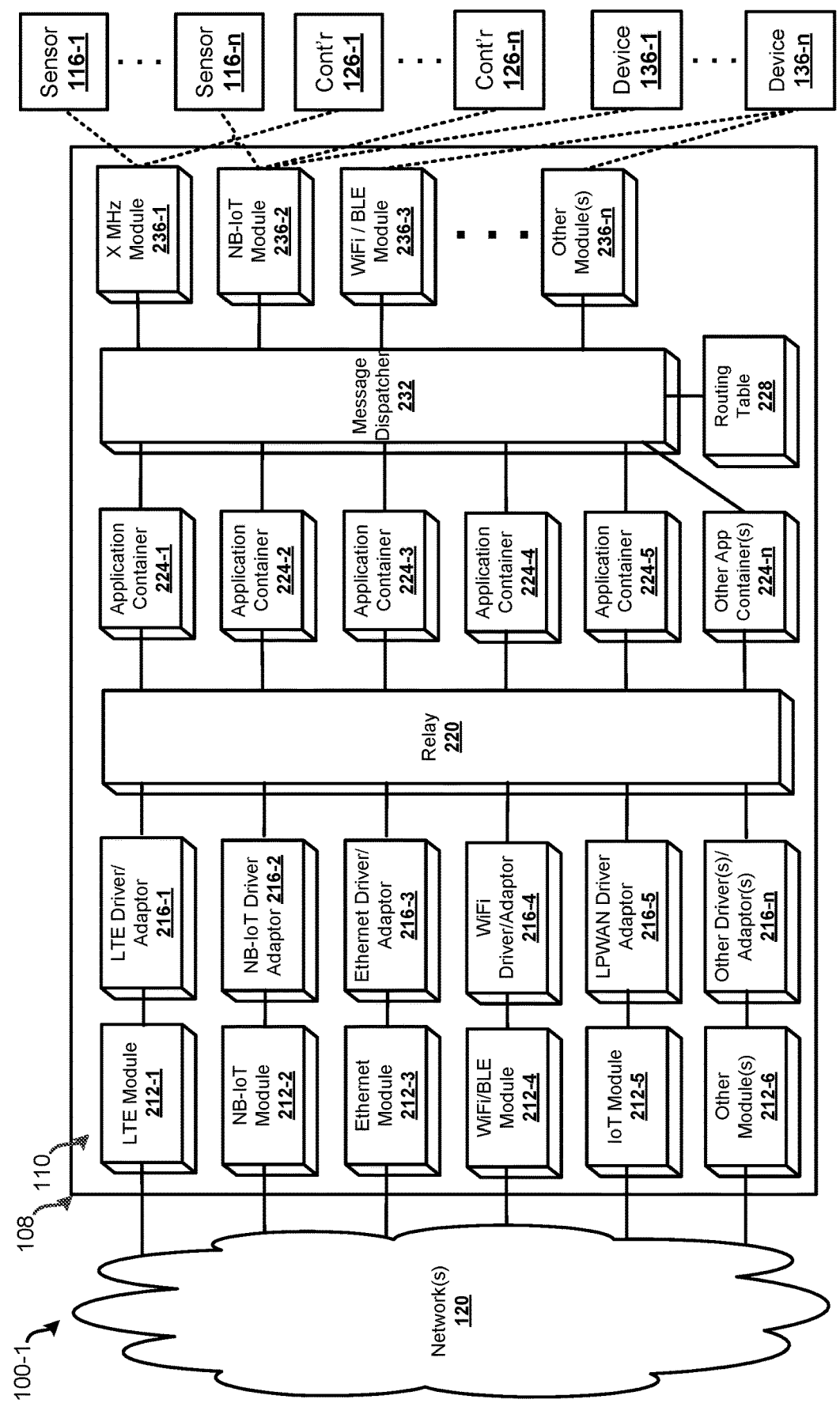
FIG. 2 illustrates certain aspects of the system, in accordance with disclosed embodiments of the present disclosure.

FIG. 2 illustrates certain aspects of the system 100-1, in accordance with embodiments of the present disclosure. As illustrated in FIGS. 1 and 2, the system controller 108 may include an adaptive gateway 110. In some embodiments, the system controller 108 may not include an adaptive gateway 110 but may be communicatively coupled therewith. The adaptive gateway 110 may be a separate media device that is distinct from, and communicating with, one or more IoT devices according to an IoT network protocol. For example, the adaptive gateway 110 may communicate with one or more sensor devices 116 within range of the adaptive gateway 110 wireless communications links. In various embodiments, the adaptive gateway 110 may facilitate communication of the one or more sensor devices 116 via the networks 120, and may also facilitate communication of multiple sensor devices 116 with each other by forming, for example, a LAN, a WAN, a HAN, a WLAN, and/or the like at various localities.

In some embodiments, the adaptive gateway 110 may include a Layer 3 network gateway device. In some embodiments, the adaptive gateway 110 may provide a bridge from one or more sensor devices 116 to a 5G wireless network of the networks 120. The adaptive gateway 110 may include any suitable routers, switches, modems, wireless transceivers, wired ports, etc., one or more processors, and input-output (I/O) interfaces, and one or more types of memory, with an operating system and instructions stored in non-transitory memory such that the adaptive gateway 110 may be configured to function as a special-purpose computer to provide the intelligent sensor control features in accordance with various embodiments disclosed herein. The adaptive gateway 110 may differentiate and indicate different types of traffic, and intelligently route traffic suitable for a next-generation network (e.g., 5G wireless network and beyond), as well as other traffic.

The adaptive gateway 110 may be configured to communicate with a plurality of sensor devices 116, identify received transmissions from the sensor devices 116 in particular types of protocols, and then route the different types of packets differently, with prioritization and different network slicing based at least in part on one or a combination of types of sensor devices 116, sensor data, network technologies, and/or packet types. In various embodiments, the adaptive gateway 110 may be configured to receive a multiplicity of transmissions according to a multiplicity of communications protocols that may corresponding to one or a combination of any suitable radio frequency communications, Wi-Fi, Bluetooth (BLE), LTE, 5G, 4G, communications per the NBIOT standard, next-generation wireless networks such as video per the ATSC 3.0 standard, and/or the like. In various embodiments, the adaptive gateway 110 may be configured with a variety of different modules 312, 336 to manage a variety of different networks of sensor devices 116 and/or may self-configure by downloading different modules 312, 336 and/or applications 224 responsive to detecting a particular sensor device 116 and determining the corresponding sensor type and module 312, 336 and/or application 224 needed for communication with the particular sensor device 116. Accordingly, the adaptive gateway 110 may be configured to include communication interface modules 336. The communication interface modules 336 may correspond to IoT modules that may, for example, include radio modules that plug into slots within the adaptive gateway 110 and host a local-area-network (LAN) over an RF interface. For example, the communication interface modules 336 may include a certain RF frequency module 336-1 (various embodiments may provide for various numbers of channels and channel ranges), a NBIOT module 336-2, a WiFi/BLE module 336-3, and/or the like modules (LTE, 5G, 4G, various low-power wide-area network modules, etc.) corresponding to one or more of the multiplicity of communications protocols. The adaptive gateway 110 may include one or more relays 220, drivers/adaptors 216, and modules 312 that facilitate transfer of data from applications 224 to the system controller 108 and vice versa. The drivers/adaptors 216 may include the software necessary to operate the different interfaces and corresponding modules 312 specifically configured for the particular network connections (e.g., LTE, 5G, 4G, NBIOT, Ethernet, WiFi, LPWAN, and/or the like).

The communications interfaces corresponding to the communication interface modules 336 and/or 312 may, for example, be capable of transmitting and receiving information wirelessly through both short range, radio frequency (RF), cellular, Wi-Fi, and/or the like connections. The communications interfaces may, for example, provide a near field communication interface (e.g., Bluetooth, optical interface, infrared interface, etc.) and/or wireless communications interfaces capable of communicating through a cellular network, Wi-Fi, and/or the like. In various embodiments, the communications interfaces may correspond to a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like in the adaptive gateway 110. The communication interface(s) corresponding to the communication interface module(s) 336 and/or 312 may include at least one antenna for wireless data transfer according to the communications protocol(s). For example, the antenna may include a cellular antenna (e.g., for sending and receiving cellular data communication, such as through a network such as a 3G, 4G, or 5G network).

The application layer communications of the adaptive gateway 110 may support a command/response protocol, where commands are messages that instruct a device or application to take some action, and responses are messages that return the result of the command message. These messages may begin with a command byte and may be followed by one or more bytes of data. The adaptive gateway 110 may include a message dispatcher 232 configured to manage traffic to and from the different sensor devices 116. The message dispatcher 232 and the modules 336 may be communicatively connected by way of one or more serial communication links. The message dispatcher 232 may, for example, manage communications between the modules 336 and applications 224. The different applications 224 that reside on the adaptive gateway 110 may consume data generated by corresponding sensor devices 116. The message dispatcher 232 may interconnect the various applications 224 to the various modules 336. While in some embodiments the various components (e.g., modules 312, modules 336, drivers and adaptors 216, relay 220, applications 224, message dispatcher 232, etc.) may be separate and distinct as illustrated, one or more of the components may be integrated in various embodiments. The message dispatcher 232 may direct traffic and route communications between the applications 224 and modules 336.

Over the lifecycle of the adaptive gateway 110, the routing table 228 may be populated as devices are plugged in. For example, when a module 336 is plugged in and the adaptive gateway 110 is powered up, the adaptive gateway 110 may discover the module 336 and may create one or more entries in the routing table 228. When a user interface is exposed to endpoints to add one or more sensor devices 116, the adaptive gateway 110 may add identification, specification, and authorization information for those sensor devices 116 to the routing table 228 so the message dispatcher 232 may subsequently understand that a particular application 224 is authorized to communicate with a sensor device 116 connected to a particular module 336 and the routing table 228 may provide the routing for the communications. For example, after an entry is added in the routing table 228 to define a route from a particular sensor device 116 and/or module 336 to a particular application 224 (and vice versa), the message dispatcher 232 may use the routing table 228 to identify a received message target. In various embodiments, the sender may provide its ID with or without a target ID, and the message dispatcher 232 may verify the authenticated routed and then transfer the message.

In some embodiments, each module 336 may maintain a list with assigned slot numbers and unique IDs of the sensor devices 116 with which the module 336 communicates. Every time the sensor device 116 communicates, the module 336 may use the list to authenticate the communication. The module 336 may determine whether it recognizes the sensor device 116 sending the communication and whether the sensor device 116 is communicating within a correct time slot to which the sensor device 116 is assigned. Once the communication is authenticated, the module 336 may pass the communication to the application 224 that is to consume the data from the sensor device 116. In alternative embodiments, the message dispatcher 232 may maintain a whitelist (e.g., in the routing table 228) for all the sensor devices 116 and may perform the communication authentications.

In various embodiments, one or more methods employed by the adaptive gateway 110 to control orchestration of sensor devices 116 and devices 106 over one or more networks 120 may include broadcast communications, receiving and processing sensor device responses, and assigning time intervals. For example, the adaptive gateway 110 may broadcast a first electronic on one or more channels of a plurality of different channels, where the first electronic broadcast is broadcasted in a first time slot of a time interval. The adaptive gateway 110 may receive and process an electronic response from a first sensor device 116 in response to the broadcasting of the first electronic broadcast, where the electronic response from the first sensor device is received in a second time slot of the time interval. The adaptive gateway 110 may transmit an electronic communication to the first sensor device 116, the electronic communication transmitted in a third time slot of the time interval and including an indication of an assignment of a fourth time slot of the time interval to the first sensor device 116.

In various embodiments, the one or more methods may include establishing connections with control devices 126 and user devices 106 with broadcast communication, receiving and processing mobile device responses, and assigning time intervals. For example, the adaptive gateway 110 may broadcast a second electronic broadcast on one or more channels of the plurality of different channels, where the second electronic broadcast is broadcasted in a fifth time slot of the time interval. The adaptive gateway 110 may receive and process an electronic response from a first endpoint control device 126 in response to the broadcasting of the second electronic broadcast, where the electronic response from the first endpoint control device 126 is received in a sixth time slot of the time interval. The adaptive gateway 110 may transmit an electronic communication to the first endpoint control device 126, the electronic communication transmitted in a seventh time slot of the time interval and including an indication of an assignment of an eighth time slot of the time interval to the first endpoint control device 126. The adaptive gateway 110 may broadcast a third electronic broadcast on one or more channels of the plurality of different channels, where the third electronic broadcast is broadcasted in a ninth time slot of the time interval. The adaptive gateway 110 may receive and process an electronic response from a first mobile device 106 in response to the broadcasting of the third electronic broadcast, where the electronic response from the first mobile device 106 is received in a tenth time slot of the time interval. The adaptive gateway 110 may transmit an electronic communication to the first mobile device 106, the electronic communication transmitted in an eleventh time slot of the time interval and including an indication of an assignment of a twelfth time slot of the time interval to the first mobile device.

In various embodiments, the one or more methods may include controlling the serving of content and corresponding interface options and processing consequent selections. For example, the adaptive gateway 110 may control serving of one or more content objects for rendering on the first mobile device 106 and facilitating one or more user-selectable interface elements via the first mobile device 106. The adaptive gateway 110 may receive and process indicia of one or more selections corresponding to the one or more user-selectable interface elements, the indicia received from the first mobile device 106. Responsive to the indicia received, the adaptive gateway 110 may transmit one or more transmissions to instruct the endpoint control device 126 to perform an operation with respect to a load. Further aspects of the one or more methods are disclosed further herein.

Figure 3:
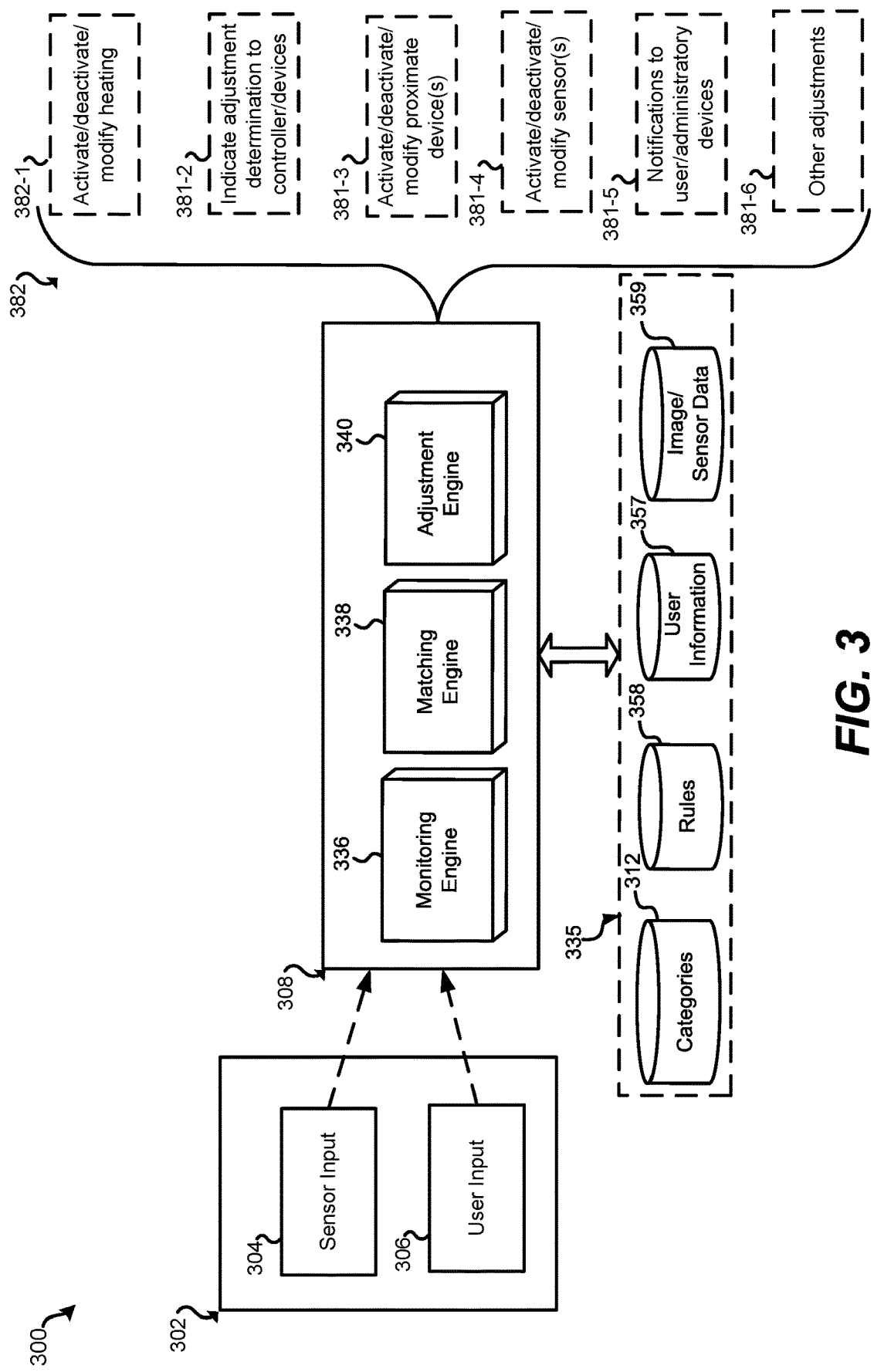
FIG. 3 illustrates a subsystem to facilitate adaptive control, in accordance with disclosed embodiments of the present disclosure.

FIG. 3 illustrates a subsystem 300 to facilitate adaptive control, in accordance with certain embodiments of the present disclosure. The subsystem 300 may correspond to aspects of the system 100. While the subsystem 300 is illustrated as being composed of multiple components, it should be understood that the subsystem 300 may be broken into a greater number of components or collapsed into fewer components. Each component may include any one or combination of computerized hardware, software, and/or firmware. In various embodiments, the subsystem 300 may include one or more adaptive processing and controlling devices 308 and one or more storage repositories 325, which may be included in the system controller 108 and/or adaptive gateway 110 and which may be located on the premises or remotely therefrom such as in the cloud.

As disclosed herein, embodiments according to the present disclosure provide technological solutions to multiple problems existing with conventional systems and approaches. Conventional systems and approaches are deficient in timeliness, adaptability, sensitivity, responsiveness, and providing access to food preparation control. The technical improvements provided by the system 100 include improvements in timeliness, adaptability, sensitivity, and responsiveness in machine control for food preparation based at least in part on adaptive machine-based control that is based at least in part on a learned endpoint, load, and load preparation patterns, causes real-time activation adjustments 382, and causes appropriate multi-stage, multi-modal control and operation of sensors 116 in real-time depending on the adjustment determinations where multiple stages of load preparation processes with different types of sensors are intelligently triggered in different ways as a function of the adjustment determinations. Further, among other things, the technical improvements provided by disclosed embodiments solve problems associated with multiplicities of sensor data being extremely computing-resource intensive—which is especially problematic at scale when simultaneously hosting services for many user devices. While processing sensor-based data from a multiplicity of sensors is extremely computing-resource intense, disclosed embodiments with selective, multi-stage sensor throttling/adjustment can require significantly fewer computing resources than otherwise, reduce latency, and increase operational speed to provide faster access at scale to manifold endpoint devices.

As depicted, the subsystem 300 includes a system control engine 308, which may be included in the system controller 108 and may executed by one or more processors of the system controller 108 in some embodiments. The system control engine 308 may be communicatively coupled with interface components and communication channels (which may take various forms in various embodiments as disclosed herein) configured to receive adjustment 382 input 302. As depicted, the adjustment 382 input 302 may include sensor input 304.

The subsystem 300 may process sensor input 304 and analyze the sensor input 304 to provide for adaptive control features disclosed herein. The sensor input 304 may be captured by the sensors 116. The control engine 308 may include a monitoring engine 336 configured to monitor the adjustment 382 input 302 for any suitable aspects pertaining to food preparation at the premises. In some embodiments, the monitoring engine 336 may correspond to the monitoring and control module 123. The control engine 308 may include a matching engine 338. The matching engine 338 may correspond to a learning engine that includes logic to implement and/or otherwise facilitate any taxonomy, classification, categorization, correlation, mapping, qualification, scoring, organization, and/or the like features disclosed herein. In various embodiments, the matching engine 338 may be configured to analyze, classify, categorize, characterize, tag, and/or annotate sensor-based data. The matching engine 338 may employ one or more artificial intelligence (machine learning or, more specifically, deep learning) algorithms to perform pattern matching to detect patterns of metrics of the sensor-based data.

The control engine 308 may include an adjustment engine 340 configured to cause the one or more adjustments 382 disclosed herein. In some embodiments, the adjustment engine 340 may analyze input monitored by the monitoring engine 336, determinations of the matching engine 338, and/or information stored in one or more repositories 325 to make adjustment 382 determinations. Based at least in part on one or more adjustment 382 determinations, the adjustment engine 340 may cause activation of one or more adjustment 382 actions. The control engine 308 may transmit one or more signals to one or more sensors 116, one or more controllers 126, one or more devices 136, and/or devices proximate to the one or more device 136 to cause the one or more sensors 116, one or more controllers 126, one or more devices 136, and/or proximate devices perform one or more operations in accordance with the one or more adjustment 382 determinations. In various embodiments, the proximate devices may include one or more computing devices and/or display devices of one or more types disclosed herein with respect to devices 106 and/or one or more automated devices with robotically controlled components (e.g., motorized tools configured to manipulate, flip, stir, move, introduce, remove, and/or otherwise handle load items with respect to the heating device). The adjustments 382 may include any one or combination of: causing activation, deactivation (e.g., operational interrupts to interrupt operations of the device), or modification of operational control settings and/or thresholds of one or both of controller 126 and a heating device 136 to alter the heating mode and/or temperature applied to one or more loads; causing a controller 126, a device 136, and/or a proximate device to display content/indicia indicating the adjustment determinations; causing activation, deactivation, or modification of operational control settings and/or thresholds of a proximate device to perform one or more operations with respect to one or more loads according to the adjustment determinations; causing activation, deactivation, or modification of operational control settings and/or thresholds of one or more sensors 116 to operate with respect to one or more loads and/or proximate area(s) according to the adjustment determinations (e.g., adjusting one or more times of one or more operations of one or more sensors 116, adjusting one or more sampling rates of one or more sensors 116, activating one or more sensors 116 of one or more different types, and/or the like); causing one or more notifications to one or more devices 106 and/or 102 to display content/indicia indicating the adjustment determinations; adjust one or more thresholds for load preparation processes and/or triggering other adjustments; and/or other like adjustments to facilitate features disclosed herein.

The matching engine 338 may perform any one or combination of image recognition, location detection, temperature sensing, infrared impressions, heat impressions, movement recognition, and/or the like. The matching engine 338 may be configured to match information for an individual load captured via the monitoring engine 336 to one or more categories from a set of categories 312 and corresponding load preparation specifications corresponding to adjustments 382 and each of the categories. The matching engine 338 may receive sensor data corresponding to one or more individual loads and/or devices, identify attributes of the one or more individual loads based at least in part on the sensor data, match the one or more individual loads to one or more categories from a category information repository 312, and identify aspects of the device, devices states, one or more loads at the device, load states, and/or the environment proximate to the device and/or one or more loads. Any suitable category may be employed to facilitate adjustment 382 features in accordance various embodiments. By way of example, category information may include categories and corresponding criteria to qualify a load for particular categories such as a type of load (e.g., a type of food item, meat, cut, and/or the like), a type of load preparation process (e.g., frying, grilling, searing, baking, broiling, a particular external load temperature for a particular period of time, and/or the like), a final load state (e.g., well done, medium rare, medium well, an internal load temperature, and/or the like), an interim load state (e.g., searing, a particular external load temperature for a particular period of time, and/or the like), and/or the like.

The monitoring engine 336 may, for example, process sensor input 304 enabling identification of motion with respect to a load at a heating device. With such identification of motion with respect to a load, the system control engine 308 may infer and/or recognize load transitions and states such as, for example, an introduction of the load to the heating device, one or more subsequent movements/repositioning of the load with respect to the heating device, removal of the load from the heating device, and/or the like. As another example, the monitoring engine 336 may process sensor input 304 enabling identification of a location of a load with respect to the heating device. This may include, for example, the system control engine 308 inferring and/or recognizing in what section, area, quadrant, rack/level, etc. of the heating device is the load located, one or a combination of which may be identified with one or more unique location identifiers. Further, the monitoring engine 336 may process sensor input 304 enabling identification of a relative location of a load with respect to one or more other loads. This may include, for example, the system control engine 308 inferring and/or recognizing one or more distances from a particular load to one or more other proximate loads at the heating device in one or more directions, along one, two, or three axes, and/or at a particular angle. As yet another example, the monitoring engine 336 may process sensor input 304 enabling identification of one or more temperatures corresponding to a load. This may include, for example, the system control engine 308 inferring and/or recognizing one or more settings of the heating device in one or more locations (e.g., sections, areas, etc.), one or more exterior temperatures of the load, one or more interior temperatures of the load, and/or the like.

As disclosed herein, the one or more sensors 116 may include, for example, one or more cameras. The camera can be any device configured to generate image and/or audio data including, for example, still image data, video image data, and/or any sound data, corresponding to detected phenomena. The one or more sensors 116 of different types may include infrared sensors and/or heat sensors. In some embodiments, the camera(s) may include one or more infrared cameras. The camera(s) may, in some embodiments, include infrared sensors. The camera(s) may provide a video and, in some embodiments, an audio stream. The matching engine 338 may perform image analysis of image data captured with cameras to determine one or more image baselines for loads, areas proximate thereto, load types, final load states, interim load states, and other load characteristics disclosed herein. The visual characteristics of a load may be identified at least in part by formatting, rescaling, cropping, and/or otherwise preparing images (or portions of the images where the outer shapes are defined as boundaries) for further image processing. The matching engine 338 may include an image analyzer and handling module, and may learn patterns of sensor-based data corresponding to visual characteristics of the sensor-based data gathered regarding the loads such as one or a combination of colors and any visual metric based at least in part on light detection—e.g., aggregate color palette, color palette as a function of time, changes in light, objects recognized, static/moving objects, pixel identification, detecting color component values, detecting color codes, and/or the like. These different visual metric types may be bases for various visual metric categories. Ranges of visual metric values for these different visual metric types may be mapped to visual metric categories.

Captured endpoint image data may be correlated to reference images using any suitable object trait qualifications (e.g., size, shape, salient features, corresponding colors, and/or the like) for correlation. The matching engine 338 may link particular load image data and reference image data to loads specifications with image data associated with loads to identify adjustments 382 needed. The reference image data may be refined over time as an image baseline(s) for a particular load type is developed with additional data captures. Such reference images may be used by the system to identify consistencies/conformities and/or inconsistencies/non-conformities with respect to particularized patterns. When such consistencies/conformities and/or inconsistencies/nonconformities satisfy one or more thresholds, certain adjustments 382 may be caused. For example, when a detected load type conforms to a specified load type pattern, the specified load preparation process may be continued, whereas, when a detected load type is determined to not conform to the load type pattern, the specified load preparation process may be interrupted and one or more notifications indicating the interrupt may be caused to be presented at the controller 126, device 136, and/or one or more devices proximate thereto. As another example, when a detected current load state conforms to an interim load state pattern linked to the identified load type, the specified load preparation process may be continued or transitioned to subsequent load preparation process specified by rules 358 (which may include one or more corresponding notifications indicating the transition caused to be presented at the controller 126, device 136, and/or one or more devices proximate thereto), whereas, when a detected current load state is determined to not conform to the interim load state pattern, the specified load preparation process may be continued until the detected current load state is determined to conform to the interim load state pattern. As yet another example, when a detected current load state conforms to a final load state pattern linked to the identified load type, the specified load preparation process may be discontinued and removal of the load from the device 136 may be caused (which may include one or more corresponding notifications indicating the removal caused to be presented at the controller 126, device 136, and/or one or more devices proximate thereto), whereas, when a detected current load state is determined to not conform to the final load state pattern, the specified load preparation process may be continued until the detected current load state is determined to conform to the final load state pattern.

Additionally or alternatively, the matching engine 338 may perform infrared analysis of infrared data captured with infrared sensors to determine one or more infrared baselines for loads and areas proximate thereto. Some embodiments may perform infrared analysis of heat data captured with heat sensors to determine one or more heat baselines for loads, areas proximate thereto, load types, final load states, interim load states, and other load characteristics disclosed herein. In various embodiments, such data may correspond to infrared/heat sampling of a portion of the load or more comprehensive infrared/heat profiles and images of the load and proximate area. Captured infrared and/or heat data may be correlated to reference infrared and/or heat impressions. The matching engine 338 may link particular load infrared and/or heat impressions to load specifications with infrared and/or heat impressions associated with loads to identify adjustments 382 needed. Like other image data, the reference infrared and/or heat impressions image data may be refined over time as infrared and/or heat baseline(s) for a particular load type are developed with additional data captures. Such reference impressions may be used by the system to identify consistencies/conformities and/or inconsistencies/nonconformities with respect to particularized patterns. When such consistencies/conformities and/or inconsistencies/nonconformities satisfy one or more thresholds, certain adjustments 382 may be caused as in the examples disclosed herein.

The one or more storage repositories 325 may include the rules 358. In some embodiments, the rules 358 may include criteria for matching a set of indicia of individual load state to a set of one or more categories. In some embodiments, the rules 358 may include criteria for matching a set of one or more categories to a set of one or more control adjustments 382. In some embodiments, rules 358 may include one or more rules for matching a set of one or more image features (e.g., size, shape, salient features, corresponding colors, and/or the like) of a detected individual load to a set of one or more control adjustments 382. By way of example, various specifications of the rules 358 may correspond to a specification of a type of load, a specification of a load preparation process, a specification of an exterior temperature corresponding to at least a portion of the load, a specification of an interior temperature corresponding to at least a portion of the load, a specification of an operation with respect to the load (e.g., positioning of the load in a particular location with respect to the heating device, repositioning of the load, flipping of the load, a selection of a type of heating to be applied to the load, specification of removal of the load from the heating device, certification of stirring or mixing of components of the load, addition of components of the load, and/or the like), a specification for a continuous feed of certain type of sensor data capturing phenomena with respect to the load (e.g., a continuous video feed of the preparation of the load to be exposed via an interface 106 and/or 102, a specification for a certain type of sensor data capturing phenomena with respect to the load which may be triggered upon sensing that a specified threshold has been reached (e.g., provide rolling windows of sensor-captured phenomena, such as video of the load to be exposed via an interface 106 and/or 102 when the threshold has been reached or for a period of time, such as 30 seconds before and 30 seconds after a threshold has been reached), a specification for a certain type of sensor data capturing phenomena with respect to the load which may be triggered upon sensing that a specified operation has been executed (e.g., provide rolling windows of sensor-captured phenomena, such as video of the load to be exposed via an interface 106 and/or 102 when the operation has been executed or for a period of time, such as 30 seconds before and 30 seconds after the operation has been executed), temporal specifications governing when or how long the above temperatures and/or operations are to be applied, and/or the like.

Some embodiments may allow for matching detected individual loads (e.g., via image recognition) with other load types (e.g., using any suitable load trait qualifications for correlation). For example, the matching engine 338 may link particular load to reference image data 359 associated with particular load types to identify a known load type or a new load type. If it is determined that one or more of the individual load characteristics do not match load characteristics associated with one or more categories, it may be determined whether one or more of the load characteristics match another already categorized load. The one or more load characteristics may be compared with those of another individual load. If characteristics matched with a second individual load satisfy a threshold, the individual can be determined to match with the category of the second individual load. Then, the individual load can be associated with the category of the second individual load.

The adjustment 382 input 302 may include user input 306. The user input 306 may include real-time user control via a user interface (e.g., one or more interfaces 106 and/or 102). The user input 306 may include one or more communication signals received consequent to selection of interface elements of the interfaces 106 and/or 102 a correspond to indicia of one or combination of the following. The user input 306 may correspond to a selection of a type of load, a selection of a load preparation process, a selection of an exterior temperature corresponding to at least a portion of the load, a selection of an interior temperature corresponding to at least a portion of the load, a selection of an operation with respect to the load (e.g., positioning of the load in a particular location with respect to the heating device, repositioning of the load, flipping of the load, a selection of a type of heating to be applied to the load, specification of removal of the load from the heating device, certification of stirring or mixing of components of the load, addition of components of the load, and/or the like), a request for a continuous feed of certain type of sensor data capturing phenomena with respect to the load (e.g., a continuous video feed of the preparation of the load to be exposed via an interface 106 and/or 102, a request for a certain type of sensor data capturing phenomena with respect to the load which may be triggered upon sensing that a specified threshold has been reached (e.g., provide rolling windows of sensor-captured phenomena, such as video of the load to be exposed via an interface 106 and/or 102 when the threshold has been reached or for a period of time, such as 30 seconds before and 30 seconds after a threshold has been reached), a request for a certain type of sensor data capturing phenomena with respect to the load which may be triggered upon sensing that a specified operation has been executed (e.g., provide rolling windows of sensor-captured phenomena, such as video of the load to be exposed via an interface 106 and/or 102 when the operation has been executed or for a period of time, such as 30 seconds before and 30 seconds after the operation has been executed), temporal specifications governing when or how long the above temperatures and/or operations are to be applied, and/or the like.

The user input 306 may include previously acquired user preferences. One or more storage repositories 325 may store one or more user profiles 357. User profiles 357 may include learned and inferred user preferences. User profiles 357 may include profiles for multiple users or may include a single profile for the system 100 in general. In some embodiments, a user is permitted to select which user profile of user profiles 357 is active via a user interface. In some embodiments, user profiles 357 may include preferences for particularized food preparation controls disclosed herein. The user profiles 357 may further include user feedback received from the user regarding customizations. The feedback data may be used to refine the customizations for particular individuals and situations.

Figure 4:
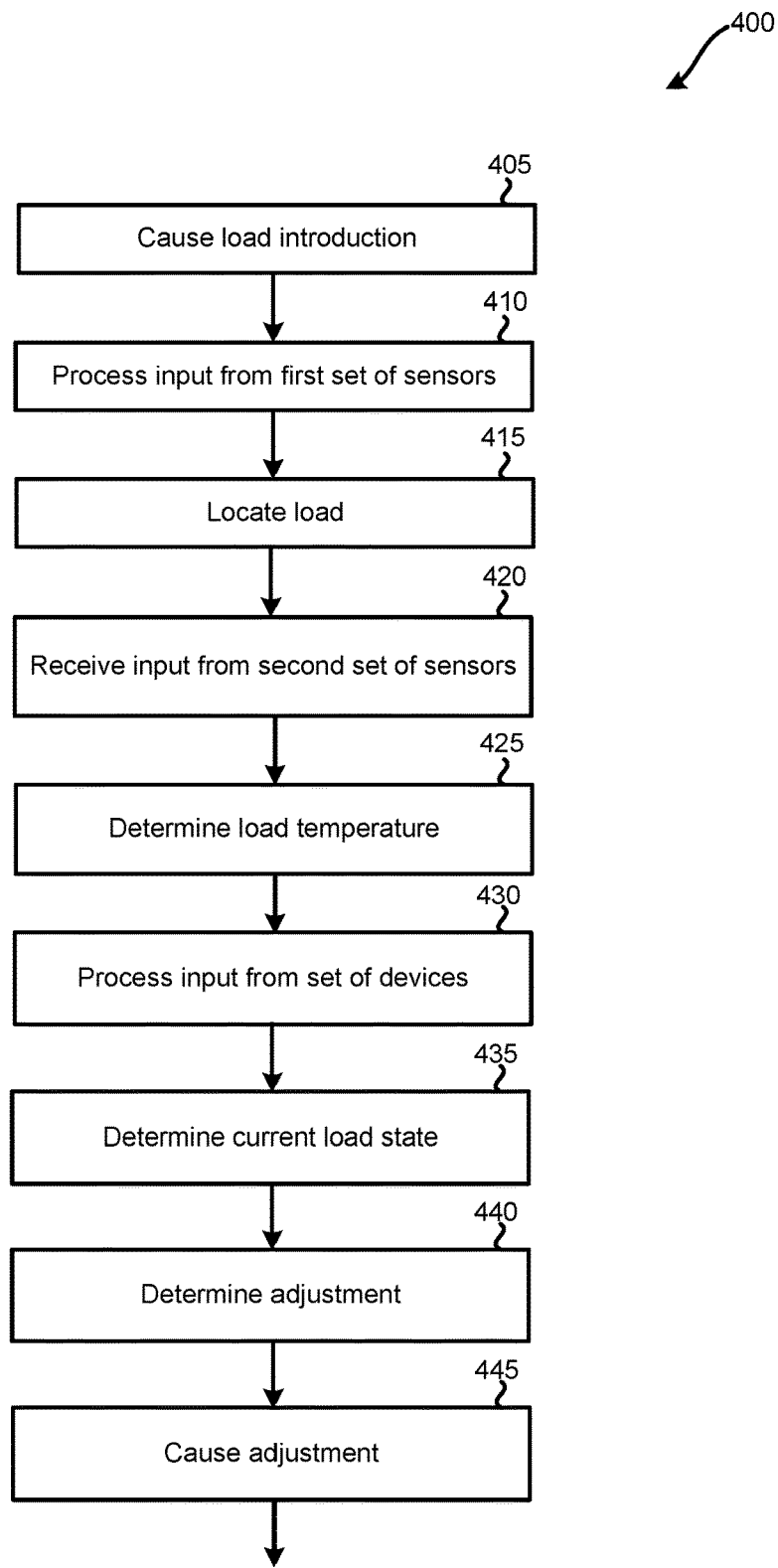
FIG. 4 illustrates an example method for adaptive control, in accordance with disclosed embodiments of the present disclosure.

FIG. 4 illustrates an example method 400 for adaptive control, in accordance with embodiments of the present disclosure. One or a combination of the aspects of the method 400 may be performed in conjunction with one or more other aspects disclosed herein, and the method 400 is to be interpreted in view of other features disclosed herein and may be combined with one or more of such features in various embodiments. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

As indicated by block 405, the system controller 108 may transmit one or more transmissions to a controller 126, a device 136, and/or a proximate device to cause introduction of a load to a heating device 136. The one or more transmissions may include a composite. The composite may include instructions and specifications as to the particular load type, a type of load preparation process, a final load state, an interim load state, and/or the like. In some embodiments, such instructions and specifications may be responsive to indicia of one or more selections corresponding to one or more user-selectable interface elements presented by a device 106, the indicia received from the device 106. In some embodiments, the controller 126, the device 136, and/or the proximate device may consequently cause presentation of a graphical indication corresponding to one or more aspects of the composite on a display device. In some embodiments, the controller 126, the device 136, and/or the proximate device may consequently cause introduction of a load to the heating device 136 in accordance with one or more aspects of the composite.

As indicated by block 410, the system controller 108 may receive and process input from a first set of one or more sensors 116 communicatively coupled to the system controller 108. Such input may be consequent to the first set of one or more sensors 116 detecting indicia of a presence of the load on a portion of the heating device 136, the input corresponding to the detected indicia of the presence of the load. In some embodiments, sensor data corresponding to the detected indicia of the presence of the load (e.g., one or more images, video) and/or content composite indicating the detected indicia of the presence of the load may be transmitted by the system controller 116 to the device 106 for presentation with the device 106.

As indicated by block 415, the system controller 108 may receive and process the input from the first set of one or more sensors 116 to determine a location of the load with respect to the heating device 136. In some embodiments, sensor data corresponding to the determined location of the load (e.g., one or more images, video) and/or content composite indicating the determined location of the load may be transmitted by the system controller 116 to the device 106 for presentation with the device 106.

As indicated by block 420, the system controller 108 may receive input from a second set of one or more sensors 116 communicatively coupled to the system controller 108, consequent to the second set of one or more sensors 116 detecting indicia of temperature corresponding to the load. As indicated by block 425, the system controller 108 may process the input from the second set of one or more sensors 116 to determine a temperature corresponding to the load based at least in part on the input. In some embodiments, the temperature may be determined based at least in part on one or more operational settings of the heating device 136 mapped to the detected location of the load. In various embodiments, the temperature may be determined based at least in part on sensor data captured by a heat sensor 116, an infrared sensor 116, and/or an image sensor 116.

The temperature may correspond to an external temperature of at least an external portion of the load. Additionally or alternatively, the temperature may correspond to an internal temperature of at least an internal portion of the load. In various embodiments, the system controller 108 may calculate or otherwise determine the temperature at least in part by correlating sensor data (e.g., heat data, infrared data, image data) of the load to reference sensor data 359 (e.g., pattern data, reference images) as disclosed herein. In some embodiments, one or more internal temperatures may be estimated from sensor data of external portions of the load. Such estimations may be based upon correlation data gathered by the system. In some embodiments, the correlation data may be learned by the system based at least in part on past patterns of external sensor data of loads of particular load types and load size categories matched with indicia of internal load temperatures. The indicia of internal load temperatures may correspond to one or a combination of sensor data from sensor devices that measure internal load temperatures (e.g., when the sensor devices are automatically and robotically applied or when the sensor devices are manually applied and the sensor data is communicated from the sensor devices in accordance with embodiments disclosed herein) and/or user input of internal temperature data. The correlations of external sensor metrics of loads to internal temperatures may be refined over time with feedback features disclosed herein, which may include presentation of estimated internal temperatures with one or more of the display device is disclosed herein along with interface elements to prompt a user input/feedback regarding the estimations. The correlations of external sensor metrics of loads (e.g., image data from image sensors) may be likewise correlated to particular load types and load size categories so that the system learns to recognize particular load types. The load size categories may be determined by the system based at least in part on matching one or both of image data and weight data from weight sensors to reference image data and weight data mapped to particular load size categories. The load size categories may be differentiated based at least in part on dimensions to take into account varying thicknesses and weights. Again, such correlations may be refined over time with feedback features. In some embodiments, sensor data corresponding to the determined temperature (e.g., one or more images, video) and/or content composite indicating the determined temperature may be transmitted by the system controller 116 to the device 106 for presentation with the device 106.

As indicated by block 430, the system controller 108 may receive and process input received from a set of one or more devices. In some embodiments, the set of one or more devices may include the device 106. The system controller 108 may receive and process the input from the device 106, the input corresponding to one or more selections of interface elements at the device 106. In various embodiments, the set of one or more devices may include the first set of one or more sensors 116 or a third set of one or more sensors 116. In some embodiments, the first set of one or more sensors 116 may include a first type of sensor, for example, a weight sensor or a motion sensor disposed in configured to detect the presence/introduction of the load on the device 136, whereas the second and third sets of one or more sensors 116 may include one or more different types of sensor that are different from the first type. For example, in some embodiments, the second set of one or more sensors 116 may include a second type of sensor may correspond to a heat sensor and/or an infrared sensor, whereas the third set of one or more sensors 116 may include a third type of sensor (e.g., an image sensor) that is different from the second type.

As indicated by block 435, the system controller 108 may analyze the input from the first set of one or more sensors 116 or from the third set of one or more sensors 116 to determine a state of the load in the location based at least in part on the input. The load state may correspond to one or more load states disclosed herein, and such load state determination may correspond to one or more embodiments disclosed herein. For example, in some embodiments, the state of the load may correspond to an activity or inactivity with respect to the load in the location with respect to at least a threshold period of time. This may correspond to how long the load has been in a particular position on the heating device 136 without being moved/flipped. Other examples are disclosed herein, such as how close to a final load state the load is, has the color profile of the load changed so that the current color profile matches an interim load state or a final load state, how long has a particular temperature or temperature range (e.g., plus or minus two degrees) been applied to at least an external portion of the load, and/or the like, one or a combination of which may be analyzed and evaluated with respect to one or more patterns and/or profiles as disclosed herein. In some embodiments, sensor data corresponding to the current load state (e.g., one or more images, video) and/or content composite indicating the current load state may be transmitted by the system controller 116 to the device 106 for presentation with the device 106.

As indicated by block 440, the system controller 108 may determine an adjustment 382 based at least in part on the temperature and the input from the set of one or more devices. In some embodiments, the determining the adjustment 382 may be based at least in part on the determined load state. As indicated by block 445, the system controller 108 may cause the heating device 136 and/or one or more devices proximate to the heating device 136 to activate, deactivate, and/or change the setting in accordance with the adjustment 382. The adjustment 382 may correspond to activating, deactivating, and/or changing a setting of the heating device 136 and/or one or more devices coupled with the heating device 136 to cause a change corresponding to the load. As in some examples disclosed herein, the change may be in one or both of a change in position of the load and a change in temperature corresponding to at least part of the load. Such a change may correspond to flipping, removing, and/or otherwise moving the load. Such a change may correspond to the heating device 136 increasing or decreasing a temperature applied to the load in the location. As disclosed herein, the causing may include sending a signal to activate a visual indicator of the controller 126, device 136, and/or proximate device to indicate the adjustment on a display. In some embodiments, sensor data corresponding to the change in the load and/or content composite indicating the change may be transmitted by the system controller 116 to the device 106 for presentation with the device 106.

Multiple iterations of one or a combination of the example operations of the method 400 may be may be performed throughout the load preparation process, with various different load state detections and determinations, and adjustments. Various embodiments are possible. For example, in some embodiments, the system controller 108 may determine an initial adjustment 382 and a steady-state adjustment 382 based at least in part on the location, the determined temperature, and the current load state. The initial adjustment 382 and the steady-state adjustment 382 corresponding to activating, deactivating, and/or changing a setting of heating device 136 and/or one or more proximate devices to cause at least two changes in temperature with respect to at least a portion of the load for different time periods. The initial adjustment 382 may cause a higher temperature to be applied for an initial time period (e.g., one minute), whereas the steady-state adjustment 382 may cause a lower temperature to be applied for subsequent time period (e.g., five minutes) after the initial time period.

As disclosed herein, one or more sets of one or more sensors 116 may be intelligently activated to operate with different modes of operation at different points in the load preparation process. For example, the activation of the first set of one or more sensors 116 may correspond to a first mode of operation, the activation of the second set of one or more sensors 116 may correspond to a second mode of operation, etc. A mode of sensor operation may include sensor activation such that the sensor is in an on state, or a detection state, as a function of time. Activation of one or more sensors 116 may be time-based and/or event-based throughout a load preparation process. For instance, one mode of operation may include sensor activation activated for detection and image capture responsive to a user request 302, with such activation being maintained for one or more specified durations. As another instance, a mode of operation may include a sensor 116 being activated repeatedly at regular intervals, random intervals, and/or upon triggering by the system controller 106 according to specifications of the load preparation process. A mode of sensor operation may include sensor activation such that the sensor operates according to one or more specified rates, for example, sampling rates. One mode of operation may correspond to a first sampling rate (e.g., number of frames per second, duration of video recording, number of still image captures per minute, number of images in a burst of still image captures, and/or the like), whereas a second mode of operation may correspond to a second sampling rate (e.g., a higher sampling rate may be selected as the load is detected to be nearing a final load state). In various embodiments, sensors 116 may be activated to capture rolling windows of sensor data when load states change and/or at times when one or more of the method steps are performed. Accordingly, some embodiments may trigger and/or throttle sensor activation at various times, with sensor data capture being terminated or decreased at other times throughout a load preparation process.

Figure 5:
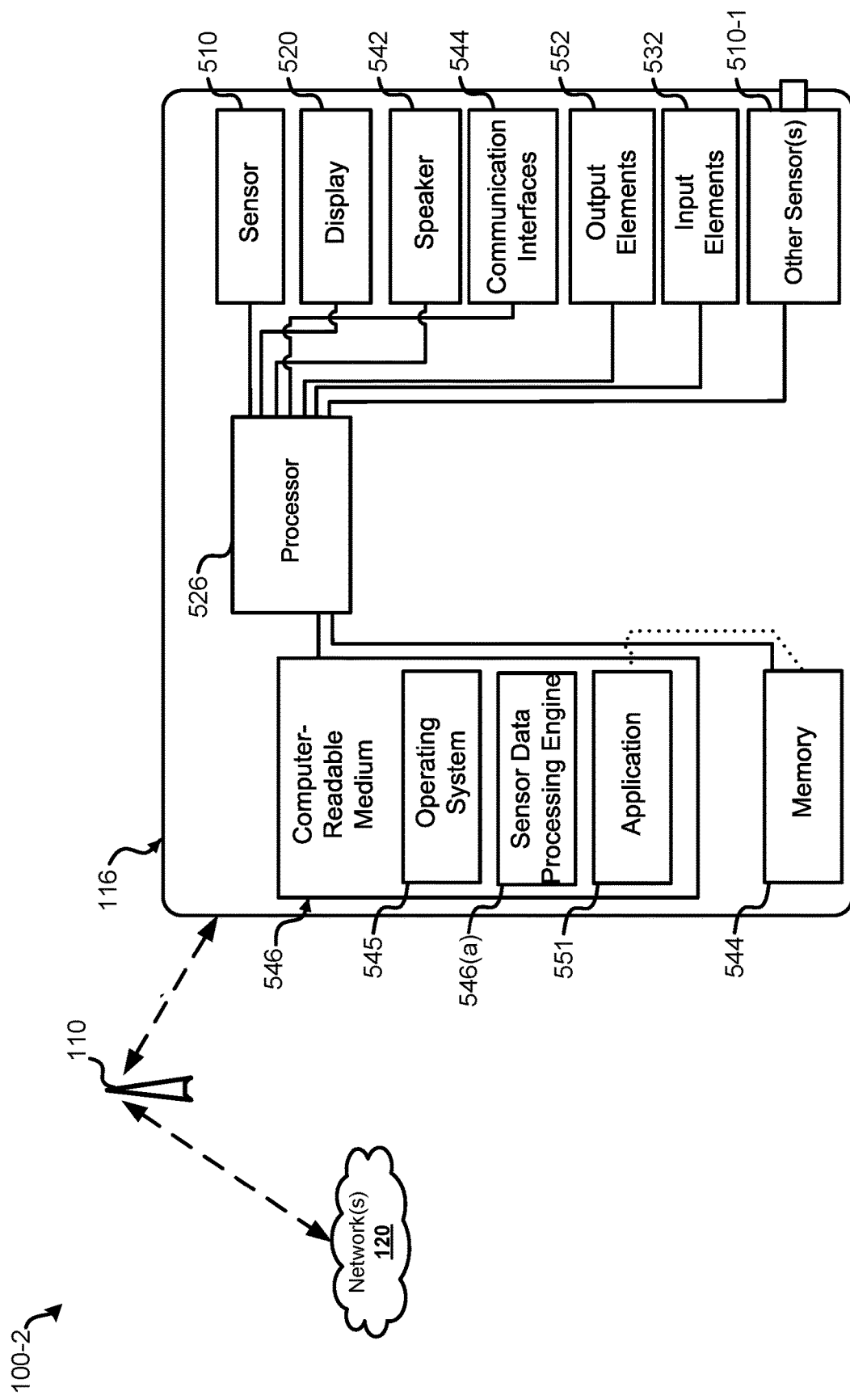
FIG. 5 illustrates certain aspects of the system, in accordance with disclosed embodiments of the present disclosure.

FIG. 5 illustrates certain aspects of the system 100, in accordance with embodiments of the present disclosure. FIG. 5 includes a block diagram of one non-limiting example of a sensor device 116 configured to make use of and interact with an adaptive gateway 110, in accordance with disclosed embodiments of the present disclosure. The sensor device 116 may be a portable device suitable for sending and receiving information to/from the adaptive gateway 110 in accordance with embodiments described herein. In some embodiments, the sensor device 116 may be provided with an application 551 or other form of software, which may be configured to run on the sensor device 116 to facilitate various embodiments of this disclosure. For example, execution of the application 551 or other software may cause the sensor device 116 to operate in accordance with protocols and methods disclosed herein to facilitate features of various embodiments. In various embodiments, the application 551 can be any suitable computer program that can be installed and run on the sensor device 116, and, in some embodiments, the application 551 may be another type of application, set of applications, and/or other executable code configured to facilitate embodiments disclosed herein. The application 551 may be provided in any suitable way. For example, the application 551 or other code may be made available from a website, an application store, the service provider 102, etc. for download to the sensor device 116; alternatively, it may be pre-installed on the sensor device 116.

The sensor device 116 may include a memory 544 communicatively coupled to a processor 526 (e.g., a microprocessor) for processing the functions of the sensor device 116. The sensor device 116 can also include at least one computer-readable medium 546 coupled to the processor 526, which stores application programs and other computer code instructions for operating the device, such as an operating system (OS) 548. In some embodiments, the application 551 or other software may be stored in the memory 544 and/or computer-readable media 546. Again, the example of sensor device 116 is non-limiting. Other devices, such as those disclosed herein, may be used.

In various embodiments, the sensor device 116 may include a display 520 and/or other output elements 552. In some embodiments, the sensor device 116 may include input elements 532 to allow a user to input information into the sensor device 116. By way of example, the input elements 532 may include one or more of a keypad, a trackball, a touchscreen, a touchpad, a pointing device, a microphone, a voice recognition device, or any other appropriate mechanism for the user to provide input. In various embodiments, the sensor device 116 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. In some embodiments, the sensor device 116 may include a speaker 542 to provide audio output to the user.

In some embodiments, the sensor device 116 may include at least one antenna for wireless data transfer to communicate with an adaptive gateway 110 as disclosed herein. The antenna may include a cellular antenna (e.g., for sending and receiving cellular voice and data communication, such as through a network such as a 3G, 4G, or 5G network). The communications interfaces 544 can provide one or more wireless communication interfaces to facilitate communications with an adaptive gateway 110 according to one or more of the communications protocols disclosed herein, e.g., with respect to the modules 336 of the adaptive gateway 110 (e.g., 433 MHz, 915 MHz, etc.), WiFi, Bluetooth (BLE), LTE, 5G, 4G, etc.).

The sensor device 116 may include one or more sensors 510 that may, for example, include one or a combination of proximity sensors, motion detectors, light sensors, cameras, infrared sensors, vibrational detectors, microphones, other audio sensors, temperature sensors, humidity sensors, barometric sensors, RFID detectors, reed switches, and/or the like configured to implement sensor IoT protocols disclosed herein. The sensor device 116 may store sensor data in the non-transitory computer-readable storage medium 546 and/or the memory 544. In some embodiments, the computer-readable medium 546 can also include a sensor data processing engine 546(a) configured to perform processing of sensor data captured by the sensor(s) 510 to analyze, aggregate, consolidate, reformat, and/or other prepare the sensor data for transmission to an adaptive gateway 110. It will be apparent to those skilled in the art that substantial variations may be made in accordance with specific requirements. For example, customized hardware might also be used, and/or particular elements might be implemented in hardware, software (including portable software, such as applets, etc.), or both.

Figure 6:
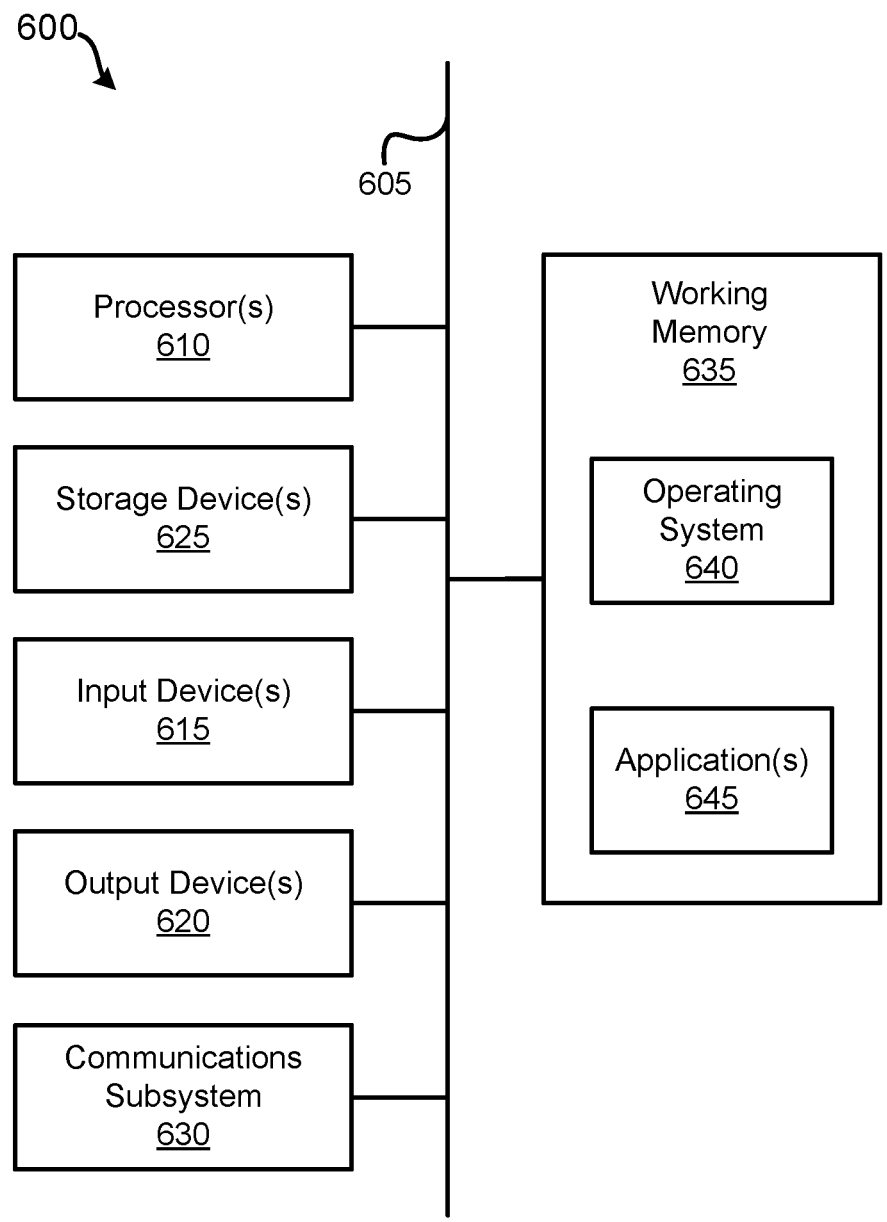
FIG. 6 illustrates aspects of a computer system that may be incorporated as part of the system controller and devices, in accordance with disclosed embodiments of the present disclosure.

FIG. 6 illustrates aspects of a computer system 600 that may be incorporated as part of the system controller 106, devices 102, 106, 116, 126, and/or 136 in accordance with embodiments of this disclosure. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, video decoders, and/or the like); one or more input devices 615, which can include without limitation a mouse, a keyboard, remote control, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium," "computer-readable medium," and that plural forms thereof as used herein, refer to any medium or media that participate in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations.

Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method for adaptive control for food preparation, the method comprising:
orchestrating, by a control device, a plurality of end-user mobile devices and a plurality of sensors associated with a plurality of loads on a heating device, where each end-user mobile device of the plurality of end-user mobile devices is associated with one or more loads of the plurality of loads and one or more portions of the heating device, the orchestrating based at least in part on receiving, by the control device, first input from a first set of one or more sensors communicatively coupled to the control device, consequent to the first set of one or more sensors detecting indicia of a presence of a load on a portion of the heating device, the first input corresponding to the detected indicia of the presence of the load;
processing, by the control device, the first input from the first set of one or more sensors to determine a location of the load with respect to the heating device;
receiving, by the control device, second input from a second set of one or more sensors communicatively coupled to the control device, consequent to the second set of one or more sensors detecting indicia of temperature corresponding to the load;
processing, by the control device, the second input from the second set of one or more sensors to determine a temperature corresponding to the load based at least in part on the second input;
processing, by the control device, third input received from a set of one or more devices comprising an end-user mobile device, and determining an adjustment based at least in part on the temperature and the third input from the set of one or more devices comprising the end-user mobile device, the adjustment corresponding to activating, deactivating, and/or changing a setting of the heating device and/or one or more devices coupled with the heating device to cause a change corresponding to the load; and
causing, by the control device, the heating device and/or one or more devices proximate to the heating device to activate, deactivate, and/or change the setting in accordance with the adjustment.

2. The method for adaptive control for food preparation as recited in claim 1, where the temperature corresponds to a temperature of an external portion of the load.

3. The method for adaptive control for food preparation as recited in claim 1, where the temperature corresponds to a temperature of an internal portion of the load.

4. The method for adaptive control for food preparation as recited in claim 1, where the set of one or more devices comprises the first set of one or more sensors or a third set of one or more sensors, and the method further comprises:
analyzing, by the control device, the third input from the first set of one or more sensors or from the third set of one or more sensors to determine a state of the load in the location based at least in part on the third input;
where the determining the adjustment is based at least in part on the state of the load.

5. The method for adaptive control for food preparation as recited in claim 4, where the state of the load corresponds to an activity or inactivity with respect to the load in the location with respect to at least a threshold period of time.

6. The method for adaptive control for food preparation as recited in claim 1, where the set of one or more devices comprises a mobile device, and the method further comprises:
processing, by the control device, the third input from the mobile device;
where the determining the adjustment is based at least in part on the third input.

7. The method for adaptive control for food preparation as recited in claim 1, where the causing comprises causing a change in one or both of position and temperature corresponding to the load.

8. A system to facilitate adaptive control for food preparation, the system comprising:
one or more processing devices; and
memory communicatively coupled with and readable by the one or more processing devices and having stored therein machine-readable instructions which, when executed by the one or more processing devices, cause the one or more processing devices to perform operations comprising:
orchestrating a plurality of end-user mobile devices and a plurality of sensors associated with a plurality of loads on a heating device, where each end-user mobile device of the plurality of end-user mobile devices is associated with one or more loads of the plurality of loads and one or more portions of the heating device, the orchestrating based at least in part on receiving first input from a first set of one or more sensors communicatively coupled to a control device, consequent to the first set of one or more sensors detecting indicia of a presence of a load on a portion of the heating device, the first input corresponding to the detected indicia of the presence of the load;
processing the first input from the first set of one or more sensors to determine a location of the load with respect to the heating device;
receiving second input from a second set of one or more sensors communicatively coupled to the control device, consequent to the second set of one or more sensors detecting indicia of temperature corresponding to the load;
processing the second input from the second set of one or more sensors to determine a temperature corresponding to the load based at least in part on the second input;
processing third input received from a set of one or more devices comprising an end-user mobile device, and determining an adjustment based at least in part on the temperature and the third input from the set of one or more devices comprising the end-user mobile device, the adjustment corresponding to activating, deactivating, and/or changing a setting of the heating device and/or one or more devices coupled with the heating device to cause a change corresponding to the load; and
causing the heating device and/or one or more devices proximate to the heating device to activate, deactivate, and/or change the setting in accordance with the adjustment.

9. The system to facilitate adaptive control for food preparation as recited in claim 8, where the temperature corresponds to a temperature of an external portion of the load.

10. The system to facilitate adaptive control for food preparation as recited in claim 8, where the temperature corresponds to a temperature of an internal portion of the load.

11. The system to facilitate adaptive control for food preparation as recited in claim 8, where the set of one or more devices comprises the first set of one or more sensors or a third set of one or more sensors, and the operations further comprise:
- analyzing the third input from the first set of one or more sensors or from the third set of one or more sensors to determine a state of the load in the location based at least in part on the third input;
- where the determining the adjustment is based at least in part on the state of the load.

12. The system to facilitate adaptive control for food preparation as recited in claim 11, where the state of the load corresponds to an activity or inactivity with respect to the load in the location with respect to at least a threshold period of time.

13. The system to facilitate adaptive control for food preparation as recited in claim 12, where the set of one or more devices comprises a mobile device, and the operations further comprise:
- processing the third input from the mobile device;
- where the determining the adjustment is based at least in part on the third input.

14. The system to facilitate adaptive control for food preparation as recited in claim 8, where the causing comprises causing a change in one or both of position and temperature corresponding to the load.

15. One or more non-transitory, machine-readable media having machine-readable instructions thereon which, when executed by one or more processing devices, cause the one or more processing devices to perform operations comprising:
- orchestrating a plurality of end-user mobile devices and a plurality of sensors associated with a plurality of loads on a heating device, where each end-user mobile device of the plurality of end-user mobile devices is associated with one or more loads of the plurality of loads and one or more portions of the heating device, the orchestrating based at least in part on receiving first input from a first set of one or more sensors communicatively coupled to a control device, consequent to the first set of one or more sensors detecting indicia of a presence of a load on a portion of the heating device, the first input corresponding to the detected indicia of the presence of the load;
- processing the first input from the first set of one or more sensors to determine a location of the load with respect to the heating device;
- receiving second input from a second set of one or more sensors communicatively coupled to the control device, consequent to the second set of one or more sensors detecting indicia of temperature corresponding to the load, processing the second input from the second set of one or more sensors to determine a temperature corresponding to the load based at least in part on the second input;
- processing third input received from a set of one or more devices comprising an end-user mobile device, and determining an adjustment based at least in part on the temperature and the third input from the set of one or more devices comprising the end-user mobile device, the adjustment corresponding to activating, deactivating, and/or changing a setting of the heating device and/or one or more devices coupled with the heating device to cause a change corresponding to the load; and
- causing the heating device and/or one or more devices proximate to the heating device to activate, deactivate, and/or change the setting in accordance with the adjustment.

16. The one or more non-transitory, machine-readable media as recited in claim 15, where the temperature corresponds to a temperature of an external portion of the load.

17. The one or more non-transitory, machine-readable media as recited in claim 15, where the temperature corresponds to a temperature of an internal portion of the load.

18. The one or more non-transitory, machine-readable media as recited in claim 15, where the set of one or more devices comprises the first set of one or more sensors or a third set of one or more sensors, and the operations further comprise:
- analyzing the third input from the first set of one or more sensors or from the third set of one or more sensors to determine a state of the load in the location based at least in part on the third input;
- where the determining the adjustment is based at least in part on the state of the load.

19. The one or more non-transitory, machine-readable media as recited in claim 18, where the state of the load corresponds to an activity or inactivity with respect to the load in the location with respect to at least a threshold period of time.

20. The one or more non-transitory, machine-readable media as recited in claim 19, where the set of one or more devices comprises a mobile device, and the operations further comprise:
- processing the third input from the mobile device;
- where the determining the adjustment is based at least in part on the third input.

\* \* \* \* \*